United States Patent [19]

Dawson et al.

[11] Patent Number: 4,712,885
[45] Date of Patent: Dec. 15, 1987

[54] LASER DIODE OPTICAL SYSTEM

[75] Inventors: Christopher Dawson, Glendora; Fritz W. Healey; Leo O. Taylor, both of Alta Loma, all of Calif.

[73] Assignee: Loral Electro-Optical Systems, Inc., Pasadena, Calif.

[21] Appl. No.: 793,666

[22] Filed: Oct. 31, 1985

[51] Int. Cl.⁴ .................................................. G02B 17/00
[52] U.S. Cl. ...................................... 350/443; 350/167
[58] Field of Search .................................. 350/167, 443

[56] References Cited

U.S. PATENT DOCUMENTS

| | | | |
|---|---|---|---|
| 804,996 | 11/1905 | Anthony | 350/443 |
| 3,022,708 | 2/1962 | Baker | 350/443 |
| 4,185,891 | 1/1980 | Kaestner | 350/167 |

*Primary Examiner*—Deborah L. Kyle
*Assistant Examiner*—Richard W. Wendtland
*Attorney, Agent, or Firm*—Spensley Horn Jubas & Lubitz

[57] ABSTRACT

A laser diode optical system includes a laser diode having non-circular beam emitted from a diode emitter junction and having a peak energy centered on an optical axis, a collimating lens spaced from the laser diode with its focus at the laser diode on the optical axis to intercept direct energy from the laser diode and produce a central collimated beam on the optical axis, a paraboloidal reflector coaxially disposed about the laser diode emitted beam and collimating the portion of the emitted beam outside the included angle subtended by the lens, the collimated energy from the reflector being refracted through the periphery of the collimating lens to direct the collimated energy from the reflector into a hollow convergent-divergent conical beam coaxial about the central beam, a plurality of spaced energy diffusing elements on a surface of the lens intercepting and diffusing direct laser diode energy impinging the lens, and also intercepting and diffusing energy from the reflector, producing a spaced pattern of overlapping diffused beams forming a generally toroidal beam coaxially disposed about the central beam.

10 Claims, 5 Drawing Figures

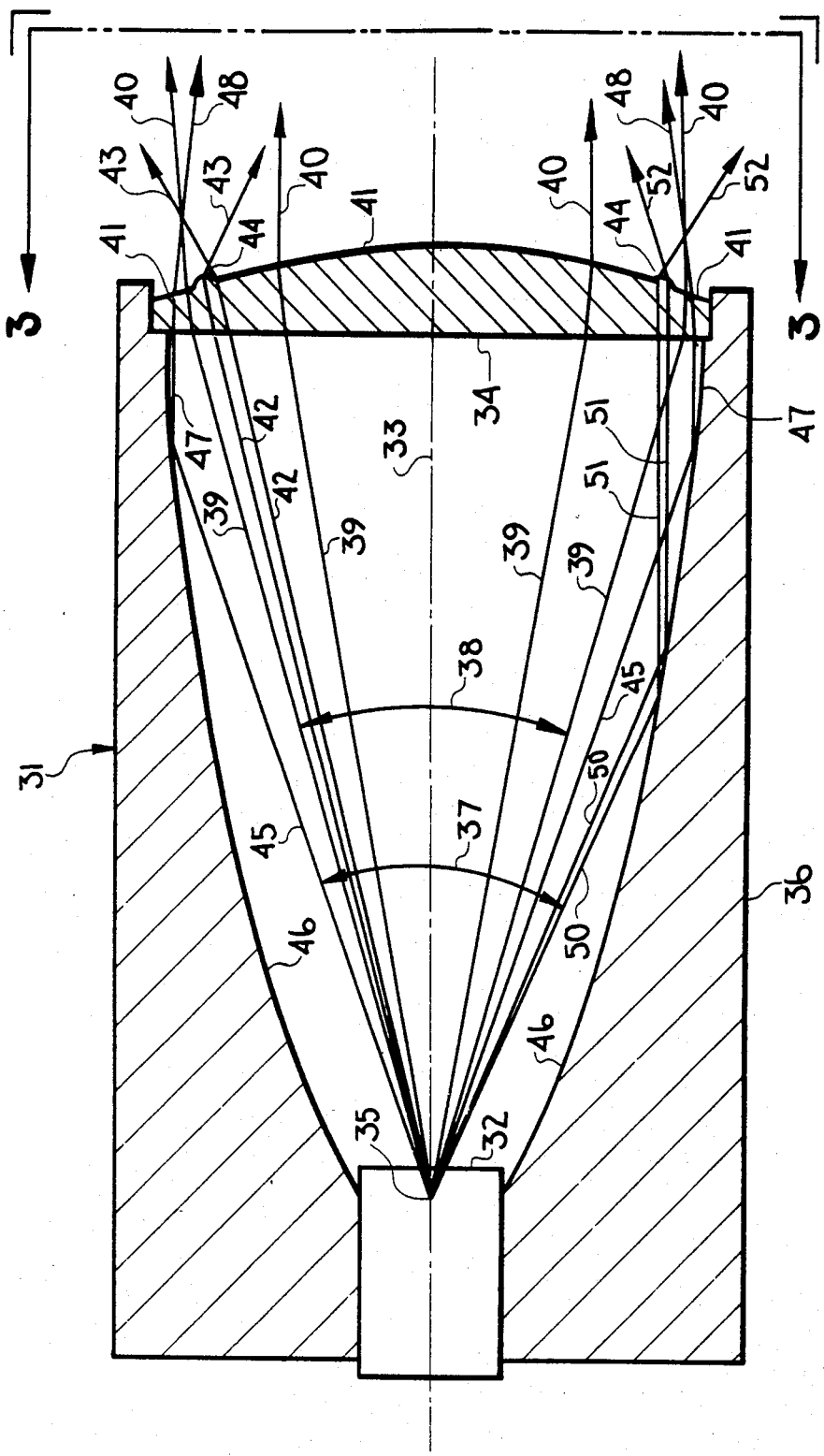

LASER DIODE OPTICAL SYSTEM

BACKGROUND OF THE INVENTION

Laser diodes have been in wide use for many years for optical aiming functions. The small physical size of less than producing a well-collimated beam of energy. Substantial optical losses are incurred in optically collecting the energy of laser diodes because the diode junction is in the form of a straight line, typically with a width of less than 5% of its length. The output of the laser diode junction is generally fan-shaped, having a radiation pattern width in excess of a 30 degree included angle in the plane of the fan, with a peak power point on the central axis. The fan pattern is much narrower, only a few degrees across in the plane normal to the fan and has also a sharply-defined peak-power point on the central axis.

In order to obtain a circular collimated beam with angular symmetry and homogeniety it has been a practice to over-fill a lens on the optical axis of the laser, utilizing a relatively high f-number lens to collect only a small central peak area of the emitted beam that has circular homogeniety, and to simply discard the balance of the emitted non-circular energy of the laser. Therefore in the interest of achieving a uniform beam, prior art devices have sacrificed efficient collection of much of the laser energy.

A greater percentage of the laser diode energy may be collected by decreasing the f-number of the lens, and thereby utilizing part of the wide sides of the fan-shaped non-circular laser output pattern. This results in underfilling the lens on the narrow sides of the laser output pattern, resulting in a non-circular and non-homogeneous transmitted beam from the optical system. Therefore increased collection efficiency in prior art devices has resulted in non-uniformity of the beam, particularly in the portion of the beam collected by the lens periphery where the lens is overfilled in the plane of the fan pattern of the laser diode energy, and underfilled normal to the fan pattern.

One of the present uses of laser junction diodes is in the the application of infra-red lasers to weapons marksmanship training devices. In these applications it is necessary to align a narrow, well-collimated laser beam with the sights of a gun or other weapon to provide training without firing live ammunition. Such systems include a pattern of spaced-apart optical detectors on a target to sense the wavelength of the laser diode. A pulse of energy from the laser and received by one or more target-mounted detectors above a set threshold energy level is recorded as a hit on the target.

It is necessary to achieve excellent collimation and circularization of the laser beam to keep the beam narrow enough to be within a target at extreme ranges often exceeding 3,000 meters. This creates an additional problem at close range, where the beam is so small in diameter it may hit the target accurately, but between detectors, and fail to register as a hit. This phenomenon is known as a pseudo-miss, and is a common problem in presently known prior art laser diode weapons training systems. The close range pseudo-miss problems are often worsened in prior art devices by attempts to focus the lens to maintain a small enough beam size at long range to stay within the target area. Such attempts have usually resulted in focussing the lens at some intermediate range distance. This procedure reduces the beam diameter in the far field, but accentuates the pseudo-miss phenomenon near the external focal point where the rays cross. The approach also increases the eye-safety hazard where the beam is narrowed and therefore concentrated at the focal point.

Prior art optical systems exhibit a pronounced enlargement of the beam diameter at certain very close to point-blank ranges. This phenomenon comes from energy in the laser diode fan pattern that is outside the narrow central energy cone directly collected by the lens. The inside surfaces of even a flat-black optical tube become relatively efficient diffusing reflectors at grazing angles of incidence. Therefore energy is reflected off the inner walls of the optical tube and is transmitted through the lens at angles well outside the direct conical angle of acceptance of the lens. This phenomenon produces severe beam blooming at close ranges. Since the energy is diffused by the internal reflecting surface and further diverges through spherical aberration from the lens, it contributes strongly to the beam at close ranges, but falls off rapidly with distance. Therefore immediately beyond the near-field blooming the beam diameter is sharply reduced. It is significant that if the near-field beam blooming was removed from prior art devices, the close-range beam would be too narrow to avoid serious pseudo-miss problems.

In order to provide an ideal system with a constant diameter beam at all ranges it therefore becomes necessary to control the internal reflections to eliminate beam blooming at very close point-blank range, and to precisely broaden the beam diameter at close and intermediate ranges to provide a constant diameter beam at all ranges. It is desireable to collect non-circular energy from the laser diode fan output with a low f-number system that is capable of producing a circular beam.

It is necessary in marksmanship training systems to indicate a shot that is a near miss. This is particularly important in war-games situations where the near miss indication prompts the target, which may be a man or vehicle, to take evasive action and try to identify the location of the shooter. In order to provide a clearly defined boundary between a hit indication and a near-miss level, it is necessary to maintain a first hit-beam threshold that is narrower than the width of a man target at all ranges, but is wider than the spacing between photodetectors on the target. The hit beam diameter threshold level must have sharply defined edges that drop to a second near-miss beam of approximately three times the diameter of the hit beam, with threshold level of about 25% of the hit-beam threshold.

It is the principal purpose of the present invention to provide a laser diode optical system for weapons training having high collection efficiency, in which a beam of laser energy striking a target having spaced photodetectors sensitive to a set threshold for a hit indication has a circular and constant beam diameter at all distances within the overall effective range of the beam, whereby at close range a pseudo-miss is precluded.

It is a further purpose of the present invention to provide a laser diode optical system for training weapons aiming and scoring in which a collimated beam of laser energy missing a target by a specified offset distance has a circular and constant beam diameter at a second, lower set detector threshold for a near-miss indication at all distances within the overall effective range of the beam, whereby at all effective ranges the near-miss offset distance is constant.

SUMMARY OF THE INVENTION

The achievement of the foregoing purposes of the present invention is accomplished through an understanding of the optical geometry of the laser diode output pattern energy distribution, as well as the internal reflective and refractive anomalies within the optical system that contribute to the final output beam. The present invention effectively utilizates a greater portion of the laser diode energy than prior art devices by using a unique optical system to produce the specific beam pattern required for laser aiming applications.

The invention provides a conventional spherical-surface lens spaced on the optical axis of the laser diode to intercept and collimate the the energy in a conical angle, including the central peak of the laser output fan pattern, into a narrow beam having an energy level above a set threshold of one or more photodetectors. The lens is provided with a plurality of circularizing and diffusing elements spaced on the lens surface, whereby part of the energy in the conical angle subtended by the lens is refracted by the diffusing elements into a circular, wide-angle near-field pattern.

The invention further provides a generally parabolic coaxial reflector in the optical tube, to collect a portion of the non-circular laser output pattern outside the conical angle subtended by the lens, and to reflect generally collimated but non-circular energy distribution to the peripheral portion of the lens concentric about the optical axis, whereby a part of the energy from the reflector is refracted by the spherical portion of the lens into an intermediate-range, intermediate-angle beam.

The invention also provides for another part of the generally collimated but non-circular energy from the reflector and striking the lens to be refracted by the circularizing diffusing elements of the lens into a circular, near-field wide-angle beam.

Measurements of the output beam pattern of laser diode optical systems constructed according to the foregoing have shown that the present invention corrects for the non-circular inhomogenieties of the laser diode energy distribution fan and provides an output beam pattern that has a first hit threshold pattern of virtually circular cross section and constant diameter from the point-blank near field to the limit of effective range of the system, and a second near-miss threshold pattern of approximately 25% of the energy level of the hit threshold having a virtually circular and constant diameter cross section approximately 3 times the diameter of the hit beam.

The beams produced by the optical systems according to the present invention have been shown to be virtually constant in diameter at all effective ranges, are free of local close-range beam enlargement characteristics of prior art devices, and also have improved eye safety by the elimination of the prior art characteristic areas of beam concentration.

BRIEF DESCRIPTION OF THE DRAWINGS

FIG. 2 is a cross-sectional view of a laser diode optical system according to the invention, take along the optical axis.

DETAILED DESCRIPTION OF THE DRAWINGS

Figure 1:
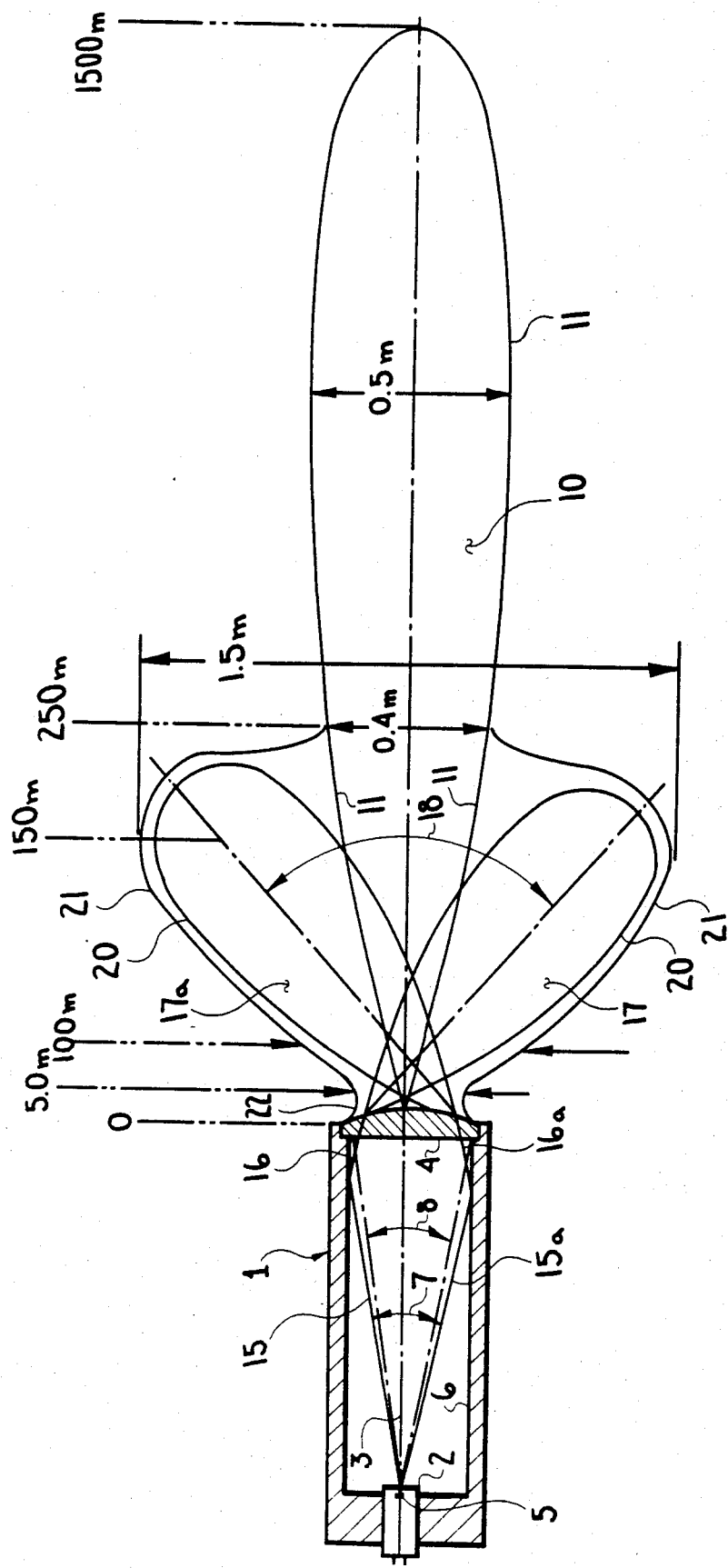
FIG. 1 is a cross-sectional view of a prior art laser diode optical system and output beam pattern, taken along the optical axis.

In FIG. 1 a prior art laser diode optical system 1 is shown having a laser diode 2 on an optical axis 3 on which a lens 4 is held is spaced with a focus at the laser diode emitter 5, by an optical tube 6. The laser diode 2 emits a beam pattern 7 which is wider than the conical angle 8 subtended by lens 4. The laser diode energy in the rays within conical angle 8 subtended by lens 4 is generally collimated in a central beam 10 defined by a limit of constant energy density 11, shown in a typical example similating a small caliber rifle, having a maximim beam diameter of 0.5 meters and a range of 1,500 meters.

Rays 15 and 15a, which are emitted by laser diode 2 outside the angle 8 subtended by lens 4, are diffusely reflected by the surface of optice tube 6 as reflected rays 16 and 16a, respectively, and are refracted and aberrated into diffuse, off-axis beams 17 and 17a, respectively, into coaxial conical angle 18 coaxial about the optical axis 3.

The off-axis beams 17 and 17a are shown in the plane of the cross-sectional view, and are representative of a continuous circular and generally conical diffuse pattern having a limit of constant energy density 20 that adds to the energy density limit 11 of the central beam 10 to produce a near field energy density limit pattern 21 of approximately 1.5 meters in diameter at a range of 150 meters. As the diffuse energy rapidly falls off with distance, it no longer contributes to beam width, leaving the diameter of the energy density limit 11 of the generally cigar-shaped central beam at approximately 0.4 meters at a range of 250 meters. Known prior art laser diode optical systems also exhibit a narrow point 22, less than 0.4 meters diameter, in the beam at the point-blank to close-range distances from 0 to 5.0 meters.

The characteristics of the prior art optical systems in the foregoing descriptions represent some problems which are addressed by the present invention. In the range from 0 to 5 meters prior art optical systems have a concentrated beam diameter that is smaller than the distance between the photodetectors on some of the commonly used laser targets, and therefore an accurate hit that strikes the target between detectors may be recorded as a miss. Also the energy density of the concentrated beam exceeds an energy density of 1.5 ergs, thereby exceeding the federally set eye safety standards for the firing rates of some weapons. Also, in the range between 100 meters and 250 meters the beam pattern is larger in diameter than the appropriate targets, whereby some shots that actually are off the target may be recorded as hits.

In FIG. 2 A laser diode optical system 31 according to the invention is shown having a laser diode 32 on an optical axis 33 on which a lens 34 ia spaced with a focus at the laser diode emitter 35 by an optical tube 36. The laser diode 32 emits a beam pattern 37 which is wider than the conical angle 38 subtended by lens 43. The laser diode energy in direct rays 39 within conical angle 38 subtended by lens 34 emerge as collimated rays 40 from a spherical surface 41 of lens 34 and are generally parallel to the optical axis 33. Additional laser diode energy in direct rays 42 striking lens 34 emerge as diffused rays 43 from a plurality of discrete diffusing elements 44 on the surface of lens 43.

Rays 45, which are emitted by the laser diode emitter 35 within a wider angle 37 outside the angle 38 subtended by lens 34, are reflected by a specular concave reflector 46, shown here as a paraboloid, and producing generally collimated reflected rays 47, which are refracted by lens 34 to emerge from the spherical surface 41 as off-axis rays 48. Reflector 46, although illustrated as a paraboloid, may be a paraboloidal approximation comprised of either a series of contiguous conical bands or contiguous reflective flats. Such approximations are optical design engineering choices dependent on the precise beam dispersions appropriate for specific applications.

Rays 50, which are also emitted by the laser diode emitter 35 within a wider angle 37 outside the angle 38 subtended by lens 34, are reflected by a specular concave reflector 46, shown here as a paraboloid, and producing generally collimated reflected rays 51, which are refracted by lens 34 to emerge as diffused rays 52 from the plurality of discrete diffusing elements 44 spaced apart near the periphery of the surface of lens 43.

Figure 3:
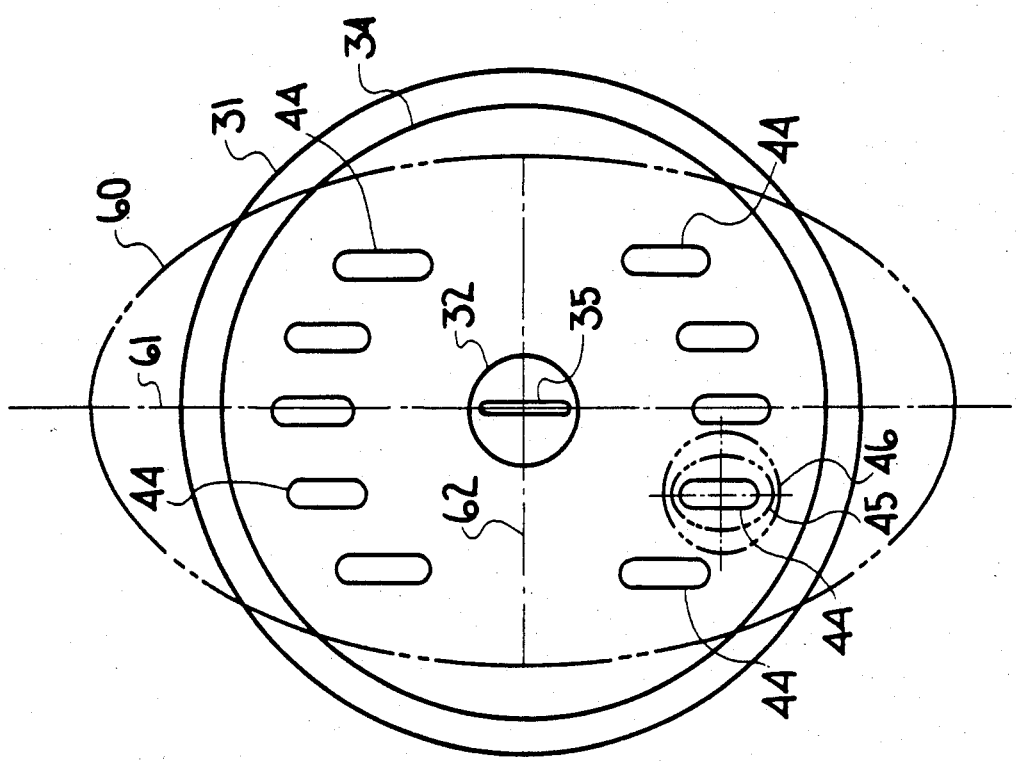
FIG. 3 is a transverse view of the face of the lens taken along plane 3—3 of FIG. 2.

In FIG. 3 a front view of the optical system taken along view 3—3 of FIG. 2 and having the lens 34 supported in optics tube 31, with the laser diode 32 having its emitter 35 having a length greater than its width and producing non-circular energy in the shape of a fan pattern 60 having a long axis 61 and a short axis 62. Discrete diffusing elements 44 are shown spaced about the periphery of lens 34. Each diffusing element 44 is elongated in the direction parallel to the long axis 61 of the laser diode fan pattern 60 and receives laser energy in a fan pattern 45. The length of the elongation of the diffusing elements 44 may be varied to vary the widening of the received laser energy in the direction of the short axis 62 of energy fan 60. The diffusing elements 44 as shown have a width-to-length aspect ratio of about 4 to 1, which has widened the received pattern into a circularized distribution 46. In practice the diffusing elements that have effectively circularized the near-field beam patterns have been very narrow, with widths of less than 0.010 inch and aspect ratios of from 3 to 10.

Figure 4:
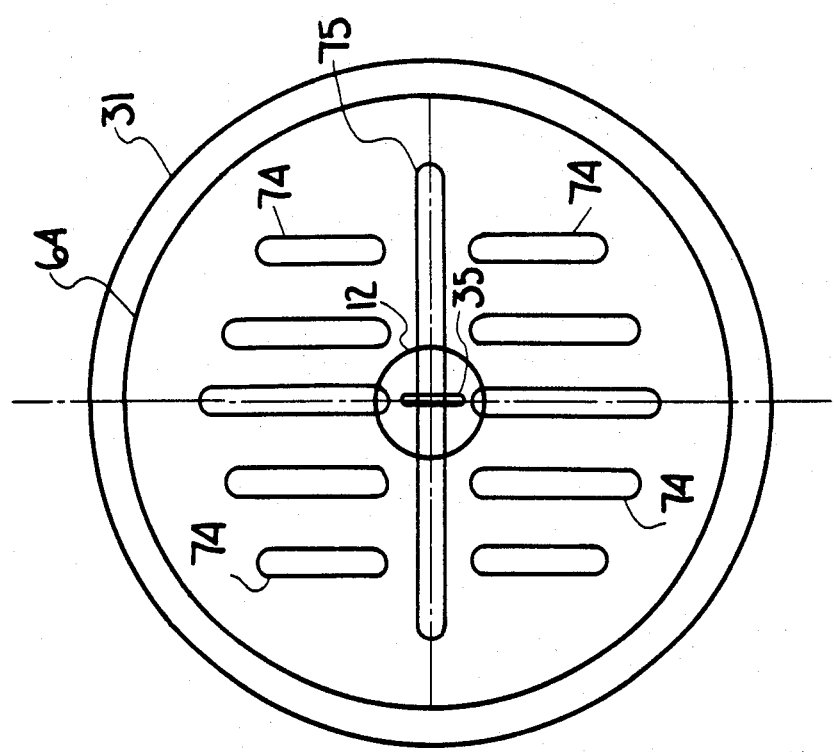
FIG. 4 is an alternate embodiment of the face of the lens of FIG. 3.

In FIG. 4 an alternate embodiment of the invention is shown in which a lens 64 is mounted in optics tube 31, and is provided with a plurality of elongated discrete diffusing elements 74 having various lengths in one plane, and at least one transverse diffusing element 75 to produce additional diffusion in the orthogonal plane. By selecting the number and placement of the diffusing elements to selectively intercept direct and reflected rays from the laser diode 32, the near-field beam pattern may readily be adjusted to any desired configuration.

Figure 5:
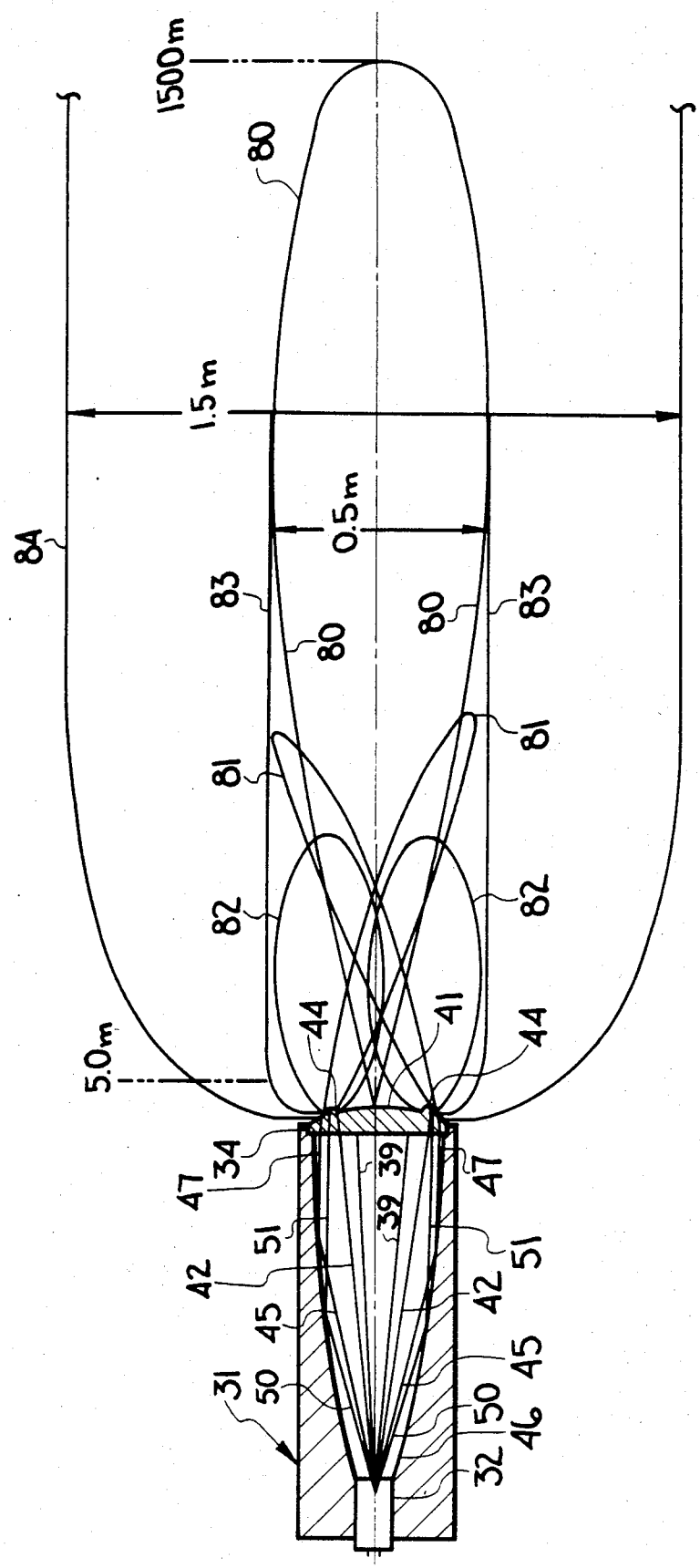
FIG. 5 is a cross-sectional view of a laser diode optical system if FIG. 2, taken along the optical axis and showing the output beam pattern.

In FIG. 5 the laser diode optical system of FIG. 2 may be seen with the beam patterns produced. Direct rays 39 from the laser diode 32 which pass through the spherical portions 41 of the lens 34 are refracted to produce a generally collimated narrow, and typically cigar-shaped long-range beam defined by the constant threshold energy density 80. Reflected rays 45 from the laser diode 32 that pass through the spherical portions 41 of lens 34 are refracted to produce off-axis, narrow intermediate-range beams defined by constant threshold energy density 81. Direct rays 42 from the laser diode 32 striking lens 34 and emerging from the discrete diffusing elements 44, and rays 45 from the laser diode and reflected by the specular reflector 46 become generally collimated rays 51 striking lens 34 and emerging from the discrete diffusing elements 44, combine to produce wide-angle, short-range diffused beams defined by constant threshold energy level 82 and combining into a generally toroidal beam pattern which is elongated in the direction of the optical axis.

The integration of the beams defined by constant energy levels 80, 81 and 82 provides a composite beam defined by the composite constant energy level 83. By selection of the shape and focal length of the reflector 46, the configuration and focal length of the spherical lens 32; and the size, configuration and placement of the diffusing elements 44, the optical system according to the invention reconfigures the non-circular, fan-shaped output of the laser diode into a circular beam having a virtually constant diameter from point-blank range to the effective maximum range.

Test units designed according to the invention for training in the firing of small caliber rifles have been demonstrated to have approximately 0.5 meter beam diameter hit indication threshold for a range up to 1500 meters, are free of the near-field beam blooming of prior art devices, and are also free of the beam narrowing that has produced pseudo-miss and eye safety problems in prior art devices. The test units also have exhibited a near-miss threshold beam diameter no greater than 1.5 meters in diameter, with a threshold of approximately 25% of the hit beam energy density.

We claim:

1. A laser diode optical system including:
   a laser diode having non-circular beam emitted from a diode emitter junction and having a peak energy centered on an optical axis,
   a collimating lens spaced from the laser diode with its focus at the diode emitter on the optical axis to intercept direct energy from the laser diode and produce a centralized collimated beam on the optical axis through the laser diode and lens,
   a generally paraboloidal reflector coaxially disposed about the laser diode emitted beam collimating the portion of the emitted beam outside the included angle subtended by the lens, the collimated energy from the reflector being refracted through the periphery of the collimating lens to direct the collimated energy from the reflector into a hollow convergent-divergent conical off-axis beam coaxial about the centralized collimated beam,
   a plurality of spaced energy diffusing elements on a surface of the lens intercepting and diffusing direct laser diode energy impinging the lens, and also intercepting and diffusing laser diode energy from the reflector, and producing a spaced pattern of overlapping diffused beams forming a generally toroidal beam coaxially disposed about the centralized collimated beam and having a cross-sectional shape elongated in the direction of the collimated beam.

2. A laser diode optical system according to claim 1 in which the collimating lens is a plano-convex lens having the planar surface facing the laser diode and the discrete energy diffusing elements integral with the convex surface of the lens.

3. A laser diode optical system according to claim 1 in which the discrete diffusing elements are spaced about the convex surface of the lens near the periphery of the lens.

4. A laser diode optical system according to claim 1 in which the non-circular laser diode output is fan shaped with a long axis and an orthogonal short axis, and each of the discrete diffucing elements is elongated in the direction parallel to the long laser diode beam axis to produce a generally circular output beam from the fan-shaped input beam.

5. A laser diode optical system according to claim 1 in which collomating lens and the paraboloidal reflector have a common focus at the laser diode emitter.

6. A laser diode optical system according to claim 3 in which at least half of the discrete diffusing elements are elongated in the direction parallel to the long axis of the long laser diode beam axis, and the remaining discrete diffusing elements are elongated in another direction.

7. A laser diode optical system according to claim 1 in which the central beam contains the majority of the laser diode energy in a narrow beam having a long range, the convergent-divergent beam has a lesser amount of energy in a wider angle beam having an intermediate range, and the diffuse toroidal beam has a still lesser amount of energy in a still wider angle beam having a short range; whereby the three beams combine in an integrated beam having a constant diameter of equal energy density at all ranges.

8. A laser diode optical system according to claim 4 in which the lens subtends a central angle generally including the narrow axis of the laser diode beam fan, and the reflector collects laser diode energy substantially in the beam fan outside the central angle subtended by the lens.

9. A laser diode optical system according to claim 1 in which the reflector is an approximation of a paraboloid comprising a plurality of contiguous conical bands.

10. A laser diode optical system according to claim 1 in which the reflector is an approximation of a paraboloid comprising a plurality of contiguous flats.

* * * * *